(12) United States Patent
Togashi

(10) Patent No.: US 7,446,996 B2
(45) Date of Patent: Nov. 4, 2008

(54) FEEDTHROUGH CAPACITOR ARRAY

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/978,619

(22) Filed: Oct. 30, 2007

(65) Prior Publication Data
US 2008/0144254 A1    Jun. 19, 2008

(30) Foreign Application Priority Data
Dec. 13, 2006  (JP)  ............... 2006-336061

(51) Int. Cl.
*H01G 4/005* (2006.01)
(52) U.S. Cl. ............ 361/303; 361/302; 361/321.2; 361/306.1; 361/306.3; 361/321.1
(58) Field of Classification Search ........... 361/303, 361/302, 301.2, 321.1, 321.2, 306.1, 306.3, 361/309, 301.4
See application file for complete search history.

(56) References Cited

U.S. PATENT DOCUMENTS

| | | | |
|---|---|---|---|
| 6,052,272 A * | 4/2000 | Kuroda et al. | 361/303 |
| 6,331,929 B1 * | 12/2001 | Masuda | 361/303 |
| 6,418,009 B1 * | 7/2002 | Brunette | 361/306.3 |
| 6,519,134 B1 * | 2/2003 | Li et al. | 361/306.1 |
| 6,587,327 B1 * | 7/2003 | Devoe et al. | 361/306.3 |
| 6,678,145 B2 * | 1/2004 | Naito et al. | 361/308.1 |
| 7,046,500 B2 * | 5/2006 | Lee et al. | 361/303 |
| 7,224,570 B2 * | 5/2007 | Yamaguchi et al. | 361/305 |
| 7,339,781 B2 * | 3/2008 | Yoshii et al. | 361/309 |

FOREIGN PATENT DOCUMENTS

JP    A 11-97291    4/1999

* cited by examiner

*Primary Examiner*—Nguyen T Ha
(74) *Attorney, Agent, or Firm*—Oliff & Berridge, PLC

(57) ABSTRACT

A feedthrough capacitor array has first and second terminal electrodes, first and second ground terminal electrodes, first and second signal internal electrodes, and first and second ground internal electrodes. The first signal internal electrode and the first ground internal electrode are arranged so as to be opposed to each other through a part of a dielectric element body. The second signal internal electrode and the second ground internal electrode are arranged to be opposed to each other through a part of the dielectric element body, in an opposed direction of the first signal internal electrode and the first ground internal electrode. The first signal internal electrode and the second ground internal electrode are arranged so as not to overlap each other in the opposed direction of the first signal internal electrode and the first ground internal electrode. The second signal internal electrode and the first ground internal electrode are arranged so as not to overlap each other in the opposed direction of the first signal internal electrode and the first ground internal electrode.

9 Claims, 11 Drawing Sheets

FEEDTHROUGH CAPACITOR ARRAY

BACKGROUND OF THE INVENTION

1. Field of the Invention

The present invention relates to a feedthrough capacitor array.

2. Related Background Art

A well-known feedthrough capacitor array is one having an element body, a plurality of signal internal electrodes arranged to penetrate the element body in order to be connected to signal lines, and a ground internal electrode to be connected to the ground, and functioning as a noise filter. For example, Japanese Patent Application Laid-open No. 11-97291 discloses the feedthrough capacitor array in a configuration in which a plurality of ceramic layers with signal internal electrodes of line shape and a plurality of ceramic layers with ground internal electrodes are alternately laminated.

SUMMARY OF THE INVENTION

In the feedthrough capacitor array described in the Laid-open No. 11-97291, each ground internal electrode is disposed between two signal internal electrodes and overlaps both of the two signal internal electrodes. For this reason, crosstalk occurs through the ground internal electrode between the two signal internal electrodes.

An object of the present invention is therefore to provide a feedthrough capacitor array capable of reducing crosstalk between a plurality of signal internal electrodes.

A feedthrough capacitor array of the present invention is a feedthrough capacitor array comprising: a dielectric element body of a substantially rectangular parallelepiped shape; a first signal internal electrode and a first ground internal electrode arranged to be opposed to each other through a part of the dielectric element body; a second signal internal electrode and a second ground internal electrode arranged to be opposed to each other through a part of the dielectric element body, in an opposed direction in which the first signal internal electrode and the first ground internal electrode are opposed; at least two first signal terminal electrodes arranged on a surface of the dielectric element body and electrically and physically connected each to the first signal internal electrode; at least two second signal terminal electrodes arranged on the surface of the dielectric element body and electrically and physically connected each to the second signal internal electrode; a first ground terminal electrode arranged on the surface of the dielectric element body and electrically and physically connected to the first ground internal electrode; and a second ground terminal electrode arranged on the surface of the dielectric element body and electrically and physically connected to the second ground internal electrode; wherein the first signal internal electrode and the second ground internal electrode are arranged so as not to overlap each other in the opposed direction; and wherein the second signal internal electrode and the first ground internal electrode are arranged so as not to overlap each other in the opposed direction.

In the feedthrough capacitor array of the present invention, the first ground internal electrode is electrically connected through the first ground terminal electrode to the ground, whereby noise is removed from a signal flowing in the first signal internal electrode arranged as opposed to the first ground internal electrode. The second ground internal electrode is electrically connected through the second ground terminal electrode to the ground, whereby noise is removed from a signal flowing in the second signal internal electrode arranged as opposed to the second ground internal electrode. The first signal internal electrode and the second ground internal electrode are arranged so as not to overlap each other in the opposed direction and the second signal internal electrode and the first ground internal electrode are arranged so as not to overlap each other, which can reduce crosstalk occurring through the first or second ground internal electrode between the first signal internal electrode and the second signal internal electrode.

Preferably, the first signal internal electrode and the second signal internal electrode are arranged so as to adjoin each other in a direction perpendicular to the opposed direction; and the first ground internal electrode and the second ground internal electrode are arranged so as to adjoin each other in the direction perpendicular to the opposed direction. This reduces occurrence of crosstalk and also achieves efficient arrangement of the first and second signal internal electrodes and the first and second ground internal electrodes in the dielectric element body, thereby implementing downsizing.

Preferably, the dielectric element body is of a rectangular parallelepiped shape elongated in one direction perpendicular to the opposed direction; the at least two first signal terminal electrodes and the first ground terminal electrode are arranged on a side face elongated in the one direction in the dielectric element body; and the at least two second signal terminal electrodes and the second ground terminal electrode are arranged on a side face opposed to the aforementioned side face in the dielectric element body. This allows the first and second signal terminal electrodes and the first and second ground terminal electrodes to be arranged in symmetry on the surface of the dielectric element body.

Preferably, at least one of the first signal internal electrode and the second signal internal electrode is of a rectangle elongated in the one direction. This allows the spacing to be set relatively large between the signal terminal electrodes to which the signal internal electrode of the rectangle elongated in the one direction is connected, and a resistance component is established by the signal internal electrode of the rectangle elongated in the one direction. Therefore, a CR multiple capacitor is formed in a configuration wherein a CR circuit is composed of a circuit including the signal internal electrode of the rectangle elongated in the one direction.

Preferably, the first signal internal electrode has two lead portions led out from two end portions thereof; and each of the two lead portions of the first signal internal electrode is electrically and physically connected to a corresponding one of the at least two first signal terminal electrodes. This allows the spacing to be set relatively large between the first signal terminal electrodes to which the first signal internal electrode is connected, and a resistance component is established by the first signal internal electrode. Therefore, a CR multiple capacitor is formed in a configuration wherein a CR circuit is composed of a circuit including the first signal internal electrode with the lead portions at the two end portions.

Preferably, the second signal internal electrode has two lead portions led out from two end portions thereof; and each of the two lead portions of the second signal internal electrode is electrically and physically connected to a corresponding one of the at least two second signal terminal electrodes. This allows the spacing to be set relatively large between the second signal terminal electrodes to which the second signal internal electrode is connected, and a resistance component is established by the second signal internal electrode. Therefore, a CR multiple capacitor is formed in a configuration wherein a CR circuit is composed of a circuit including the second signal internal electrode with the lead portions at the two end portions.

Preferably, at least one ground internal electrode out of the first ground internal electrode and the second ground internal electrode has a plurality of lead portions electrically and physically connected each to the first ground terminal electrode or the second ground terminal electrode corresponding thereto. This allows an electric current to the first or second ground terminal electrode to be separately flowed through the plurality of lead portions, whereby parasitic inductance can be reduced in the lead portions.

Preferably, each of the first signal internal electrode and the second signal internal electrode has at least two lead portions electrically and physically connected to the at least two first signal terminal electrodes or the at least two second signal terminal electrodes corresponding thereto; each of the first ground internal electrode and the second ground internal electrode has a lead portion electrically and physically connected to the first ground terminal electrode or the second ground terminal electrode corresponding thereto; and a width of the lead portion of the first ground internal electrode or the second ground internal electrode is larger than a width of the lead portions of the first signal internal electrode and the second signal internal electrode. This makes relatively large the cross section of the lead portion of the first or second ground internal electrode, whereby parasitic inductance can be reduced in the lead portion.

Preferably, the feedthrough capacitor array comprises a capacitor internal electrode arranged to be opposed to at least one ground internal electrode out of the first ground internal electrode and the second ground internal electrode through a part of the dielectric element body; the capacitor internal electrode is electrically and physically connected to the first signal terminal electrode or the second signal terminal electrode. In this case, a capacitor component is established by the ground internal electrode and the capacitor internal electrode. Therefore, impedance is made low in a wider band in a circuit including the capacitor internal electrode.

With the feedthrough capacitor array of the present invention, crosstalk is reduced between a plurality of signal internal electrodes.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The preferred embodiments of the present invention will be described below in detail with reference to the accompanying drawings. The same elements or elements with the same functionality will be denoted by the same reference symbols in the description, without redundant description.

First Embodiment

Figure 1:
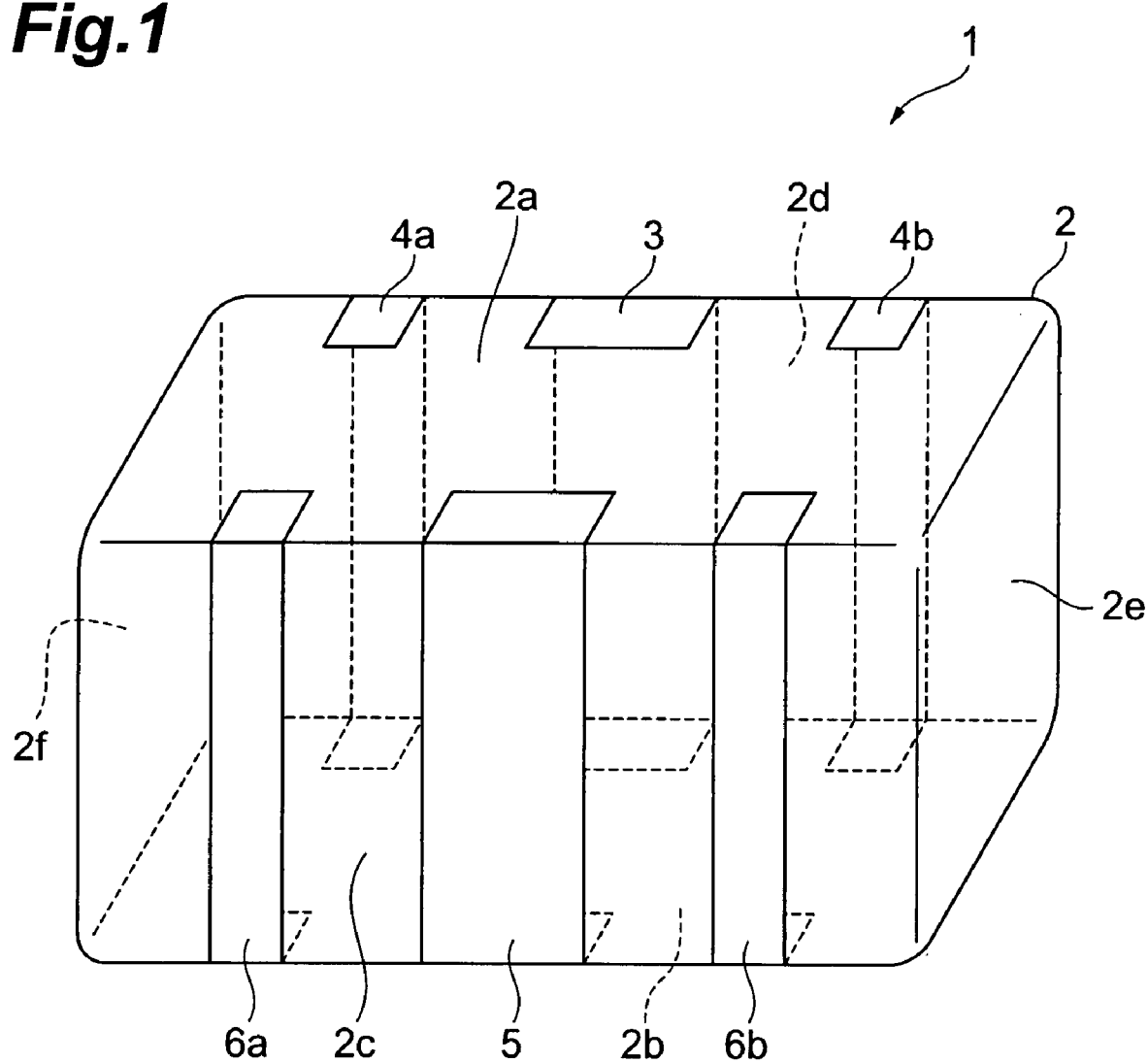
FIG. 1 is a schematic perspective view showing a feedthrough capacitor array of the first embodiment.

FIG. 1 is a schematic perspective view showing a feedthrough capacitor array of the first embodiment. As shown in FIG. 1, the feedthrough capacitor array 1 of the present embodiment has a dielectric element body 2 of a nearly rectangular parallelepiped shape, and a first ground terminal electrode 3, two first signal terminal electrodes 4a, 4b, a second ground terminal electrode 5, and two second signal terminal electrodes 6a, 6b which are arranged to be isolated from each other on the surface of the dielectric element body 2.

The feedthrough capacitor array 1 is so arranged that the first ground terminal electrode 3 is connected to the ground and that the first signal terminal electrodes 4a, 4b are connected in series to a first signal line (not shown), whereby the feedthrough capacitor array 1 functions as a noise filter for a signal flowing in the first signal line. The feedthrough capacitor array 1 is so arranged that the second ground terminal electrode 5 is connected to the ground and that the second signal terminal electrodes 6a, 6b are connected in series to a second signal line (not shown), whereby the feedthrough capacitor array 1 functions as a noise filter for a signal flowing in the second signal line. In this manner, the feedthrough capacitor array 1 constitutes two circuits functioning as the noise filters.

The dielectric element body 2 has a principal face 2a and a principal face 2b opposed to each other, a side face 2c and a side face 2d perpendicular to the principal faces 2a, 2b and opposed to each other, and a end face 2e and a end face 2f perpendicular to the principal faces 2a, 2b and to the side faces 2c, 2d and opposed to each other in the longitudinal direction of the dielectric element body 2.

The first ground terminal electrode 3 is formed in the central region of the side face 2d and formed so as to extend in the opposed direction of the principal faces 2a and 2b and come round to the principal faces 2a and 2b. The two first signal terminal electrodes 4a, 4b are formed on both sides of the first ground terminal electrode 3 on the side face 2d and formed so as to extend in the opposed direction of the principal faces 2a and 2b and come round to the principal faces 2a and 2b. The first signal terminal electrode 4a is formed on the end face 2f side and the first signal terminal electrode 4b is formed on the end face 2e side. The width of the first ground terminal electrode 3 (the width in the longitudinal direction of the dielectric element body 2) is set to be larger than the width of the first signal terminal electrodes 4a, 4b.

The second ground terminal electrode 5 is formed in the central region of the side face 2c and formed so as to extend in the opposed direction of the principal faces 2a and 2b and come round to the principal faces 2a and 2b. The two second signal terminal electrodes 6a, 6b are formed on both sides of the second ground terminal electrode 5 on the side face 2c and formed so as to extend in the opposed direction of the principal faces 2a and 2b and come round to the principal faces 2a and 2b. The second signal terminal electrode 6a is formed on the end face 2f side and the second signal terminal electrode 6b on the end face 2e side. The width of the second ground terminal electrode 5 (the width in the longitudinal direction of the dielectric element body 2) is set to be larger than the width of the second signal terminal electrodes 6a, 6b.

The first ground terminal electrode 3 and first signal terminal electrodes 4a, 4b, and the second ground terminal electrode 5 and second signal terminal electrodes 6a, 6b are arranged on the side faces 2d, 2c, respectively, extending in the longitudinal direction and opposed to each other in the dielectric element body 2. These first and second ground terminal electrodes 3, 5 and the first and second signal terminal electrodes 4a, 4b, 6a, 6b are baked electrodes of Cu or Ag, and Ni-plated and Su-plated layers are formed on their surface.

Figure 2:
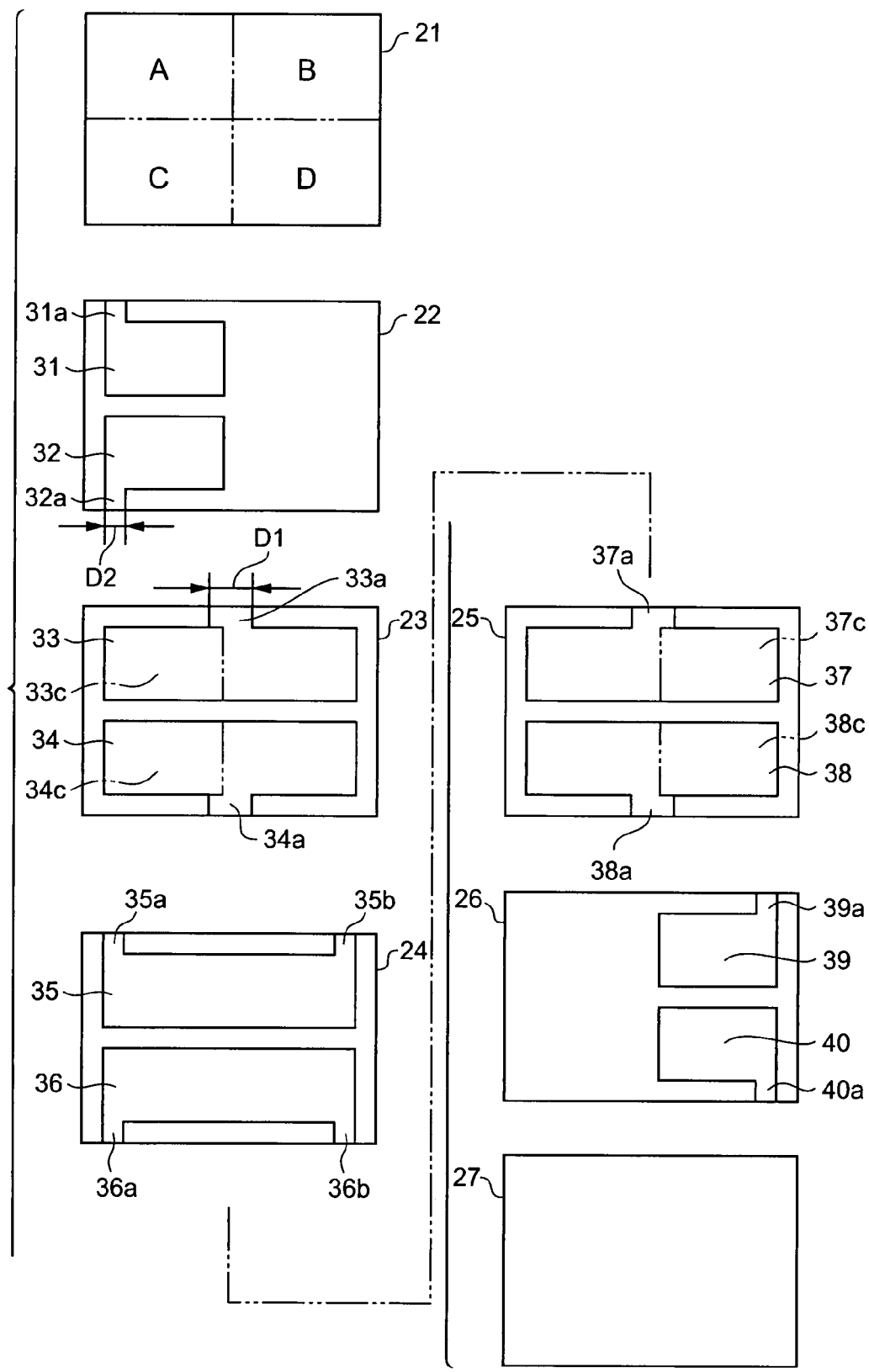
FIG. 2 is a schematic view showing a configuration of a dielectric element body and internal electrodes in the feedthrough capacitor array of the first embodiment.

FIG. 2 is a schematic view showing a configuration of the dielectric element body and each of internal electrodes included in the feedthrough capacitor array of the first embodiment. As shown in FIG. 2, the dielectric element body 2 is formed in the nearly rectangular parallelepiped shape by laminating dielectric layers 21-27 of a rectangle in order in the opposed direction of the principal faces 2a, 2b. The description below will be given with the dielectric layers 21-27 for convenience' sake of description, but it is noted that in the practical feedthrough capacitor array 1 the dielectric layers 21-27 are integrally formed so that no boundary can be visually recognized between them. Each dielectric layer 21-27 corresponds to a part of the dielectric element body 2. The dielectric element body 2 is made of a dielectric material such as a $BaTiO_3$-based ceramic. The feedthrough capacitor array 1 includes capacitor internal electrodes 31, 32, a first ground internal electrode 33, a second ground internal electrode 34, a first signal internal electrode 35, a second signal internal electrode 36, a first ground internal electrode 37, a second ground internal electrode 38, and capacitor internal electrodes 39, 40 formed in the dielectric element body 2. These electrodes are made, for example, of Ni, an Ni alloy, or the like.

Subsequently, these electrodes formed in the dielectric element body 2 will be described below. For description, each dielectric layer 21-27 is quartered by a plane parallel to the side face 2c and a plane parallel to the end face 2e, and the quarters are denoted by region A for the region on the side face 2d and end face 2f side, region B for the region on the side face 2d and end face 2e side, region C for the region on the side face 2c and end face 2f side, and region D for the region on the side face 2c and end face 2e side.

The two capacitor internal electrodes 31, 32 isolated from each other are formed on the dielectric layer 22. The capacitor internal electrodes 31, 32 are arranged so as to adjoin each other in the direction perpendicular to the laminate direction of the dielectric layers 21-27 and to the longitudinal direction of the dielectric element body 2.

The capacitor internal electrode 31 is formed in a rectangular shape in region A. The capacitor internal electrode 31 has a lead portion 31a led out from the edge on the end face 2f side to the side face 2d side. The lead portion 31a is electrically and physically connected to the first signal terminal electrode 4a arranged on the side face 2d. This causes the capacitor internal electrode 31 to be electrically and physically connected to the first signal terminal electrode 4a.

The capacitor internal electrode 32 is formed in a rectangular shape in region C. The capacitor internal electrode 32 has a lead portion 32a led out from the edge on the end face 2f side to the side face 2c side. The lead portion 32a is electrically and physically connected to the second signal terminal electrode 6a arranged on the side face 2c. This causes the capacitor internal electrode 32 to be electrically and physically connected to the second signal terminal electrode 6a.

The first ground internal electrode 33 and the second ground internal electrode 34 isolated from each other are formed on the dielectric layer 23. The first ground internal electrode 33 and the second ground internal electrode 34 are arranged so as to adjoin each other in the direction perpendicular to the laminate direction of the dielectric layers 21-27 and to the longitudinal direction of the dielectric element body 2.

The first ground internal electrode 33 is formed in a rectangular shape in region A and region B and is so formed that the longitudinal direction thereof extends along the longitudinal direction of the dielectric element body 2. The first ground internal electrode 33 has a lead portion 33a led out from the central region on the side face 2d side to the side face 2d side. The lead portion 33a is electrically and physically connected to the first ground terminal electrode 3 arranged on the side face 2d. This causes the first ground internal electrode 33 to be electrically and physically connected to the first ground terminal electrode 3.

The second ground internal electrode 34 is formed in a rectangular shape in region C and region D and is so formed that the longitudinal direction thereof extends along the longitudinal direction of the dielectric element body 2. The second ground internal electrode 34 has a lead portion 34a led out from the central region on the side face 2c side to the side face 2c side. The lead portion 34a is electrically and physically connected to the second ground terminal electrode 5 arranged on the side face 2c. This causes the second ground internal electrode 34 to be electrically and physically connected to the second ground terminal electrode 5.

As the dielectric layer 22 and the dielectric layer 23 are laminated, the first ground internal electrode 33 is opposed through the dielectric layer 22 to the capacitor internal electrode 31 and a part 33c of the first ground internal electrode 33 in region A overlaps with the capacitor internal electrode 31. As the dielectric layer 22 and the dielectric layer 23 are laminated, the second ground internal electrode 34 is opposed through the dielectric layer 22 to the capacitor internal electrode 32 and a part 34c of the second ground internal electrode 34 in region C overlaps with the capacitor internal electrode 32.

The first signal internal electrode 35 and the second signal internal electrode 36 isolated from each other are formed on the dielectric layer 24. The first signal internal electrode 35 and the second signal internal electrode 36 are arranged so as to adjoin each other in the direction perpendicular to the laminate direction of the dielectric layers 21-27 and to the longitudinal direction of the dielectric element body 2.

The first signal internal electrode 35 is formed in a rectangular shape in region A and region B and is so formed that the longitudinal direction thereof extends along the longitudinal direction of the dielectric element body 2. The first signal internal electrode 35 has two lead portions 35a, 35b led out from two end portions on the end face 2e side and on the end face 2f side to the side face 2d side. The lead portions 35a, 35b are electrically and physically connected to the two first signal terminal electrodes 4a, 4b, respectively, arranged on the side face 2d. This causes the first signal internal electrode 35 to be electrically and physically connected to the two first signal terminal electrodes 4a, 4b.

The second signal internal electrode 36 is formed in a rectangular shape in region C and region D and is so formed that the longitudinal direction thereof extends along the longitudinal direction of the dielectric element body 2. The second signal internal electrode 36 has two lead portions 36a, 36b led out from two end portions on the end face 2e side and on the end face 2f side to the side face 2c side. The lead portions 36a, 36b are electrically and physically connected to the two second signal terminal electrodes 6a, 6b, respectively, arranged on the side face 2c. This causes the second signal internal electrode 36 to be electrically and physically connected to the two second signal terminal electrodes 6a, 6b.

As the dielectric layer 23 and the dielectric layer 24 are laminated, the first signal internal electrode 35 is opposed to the first ground internal electrode 33, while they overlap each other. As the dielectric layer 23 and the dielectric layer 24 are laminated, the second signal internal electrode 36 is opposed to the second ground internal electrode 34, while they overlap each other.

The first ground internal electrode 37 and the second ground internal electrode 38 isolated from each other are formed on the dielectric layer 25. The first ground internal electrode 37 and the second ground internal electrode 38 are arranged so as to adjoin each other in the direction perpendicular to the laminate direction of the dielectric layers 21-27 and to the longitudinal direction of the dielectric element body 2.

The first ground internal electrode 37 is formed in a rectangular shape in region A and region B and is so formed that the longitudinal direction thereof extends along the longitudinal direction of the dielectric element body 2. The first ground internal electrode 37 has a lead portion 37a led out from the central region on the side face 2d side to the side face 2d side. The lead portion 37a is electrically and physically connected to the first ground terminal electrode 3 arranged on the side face 2d. This causes the first ground internal electrode 37 to be electrically and physically connected to the first ground terminal electrode 3.

The second ground internal electrode 38 is formed in a rectangular shape in region C and region D and is so formed that the longitudinal direction thereof extends along the longitudinal direction of the dielectric element body 2. The second ground internal electrode 38 has a lead portion 38a led out from the central region on the side face 2c side to the side face 2c side. The lead portion 38a is electrically and physically connected to the second ground terminal electrode 5 arranged on the side face 2c. This causes the second ground internal electrode 38 to be electrically and physically connected to the second ground terminal electrode 5.

As the dielectric layer 24 and the dielectric layer 25 are laminated, the first ground internal electrode 37 is opposed to the first signal internal electrode 35, while they overlap each other. As the dielectric layer 24 and the dielectric layer 25 are laminated, the second ground internal electrode 38 is opposed to the second signal internal electrode 36, while they overlap each other.

The two capacitor internal electrodes 39, 40 isolated from each other are formed on the dielectric layer 26. The capacitor internal electrodes 39, 40 are arranged so as to adjoin each other in the direction perpendicular to the laminate direction of the dielectric layers 21-27 and to the longitudinal direction of the dielectric element body 2.

The capacitor internal electrode 39 is formed in a rectangular shape in region B. The capacitor internal electrode 39 has a lead portion 39a led out from the edge on the end face 2e side to the side face 2d side. The lead portion 39a is electrically and physically connected to the first signal terminal electrode 4b arranged on the side face 2d. This causes the capacitor internal electrode 39 to be electrically and physically connected to the first signal terminal electrode 4b.

The capacitor internal electrode 40 is formed in a rectangular shape in region D. The capacitor internal electrode 40 has a lead portion 40a led out from the edge on the end face 2e side to the side face 2c side. The lead portion 40a is electrically and physically connected to the second signal terminal electrode 6b arranged on the side face 2c. This causes the capacitor internal electrode 40 to be electrically and physically connected to the second signal terminal electrode 6b.

As the dielectric layer 25 and the dielectric layer 26 are laminated, the capacitor internal electrode 39 is opposed through the dielectric layer 25 to the first ground internal electrode 37 and a part 37c of the first ground internal electrode 37 in region B overlaps with the capacitor internal electrode 39. As the dielectric layer 25 and the dielectric layer 26 are laminated, the capacitor internal electrode 40 is opposed through the dielectric layer 25 to the second ground internal electrode 38 and a part 38c of the second ground internal electrode 38 in region D overlaps with the capacitor internal electrode 40.

The laminate direction of the dielectric layers 21-27, the opposed direction of the first ground internal electrodes 33, 37 and the first signal internal electrode 35, and the opposed direction of the second ground internal electrodes 34, 38 and the second signal internal electrode 36 are parallel to each other. These opposed directions are perpendicular to the longitudinal direction of the dielectric element body 2. The first ground internal electrodes 33, 37 and the second signal internal electrode 36 are arranged so as not to overlap each other in the opposed direction, and the second ground internal electrodes 34, 38 and the first signal internal electrode 35 are arranged so as not to overlap each other in the opposed direction.

The width of the lead portions 33a, 37a, 34a, 38a of the first ground internal electrodes 33, 37 and the second ground internal electrodes 34, 38 (the width in the longitudinal direction of the dielectric element body 2) D1 is set to be larger than the width D2 of the lead portions 31a, 32a, 39a, 40a, 35a, 35b, 36a, 36b of the capacitor internal electrodes 31, 32, 39, 40 and the first and second signal internal electrodes 35 and 36.

Figure 3:
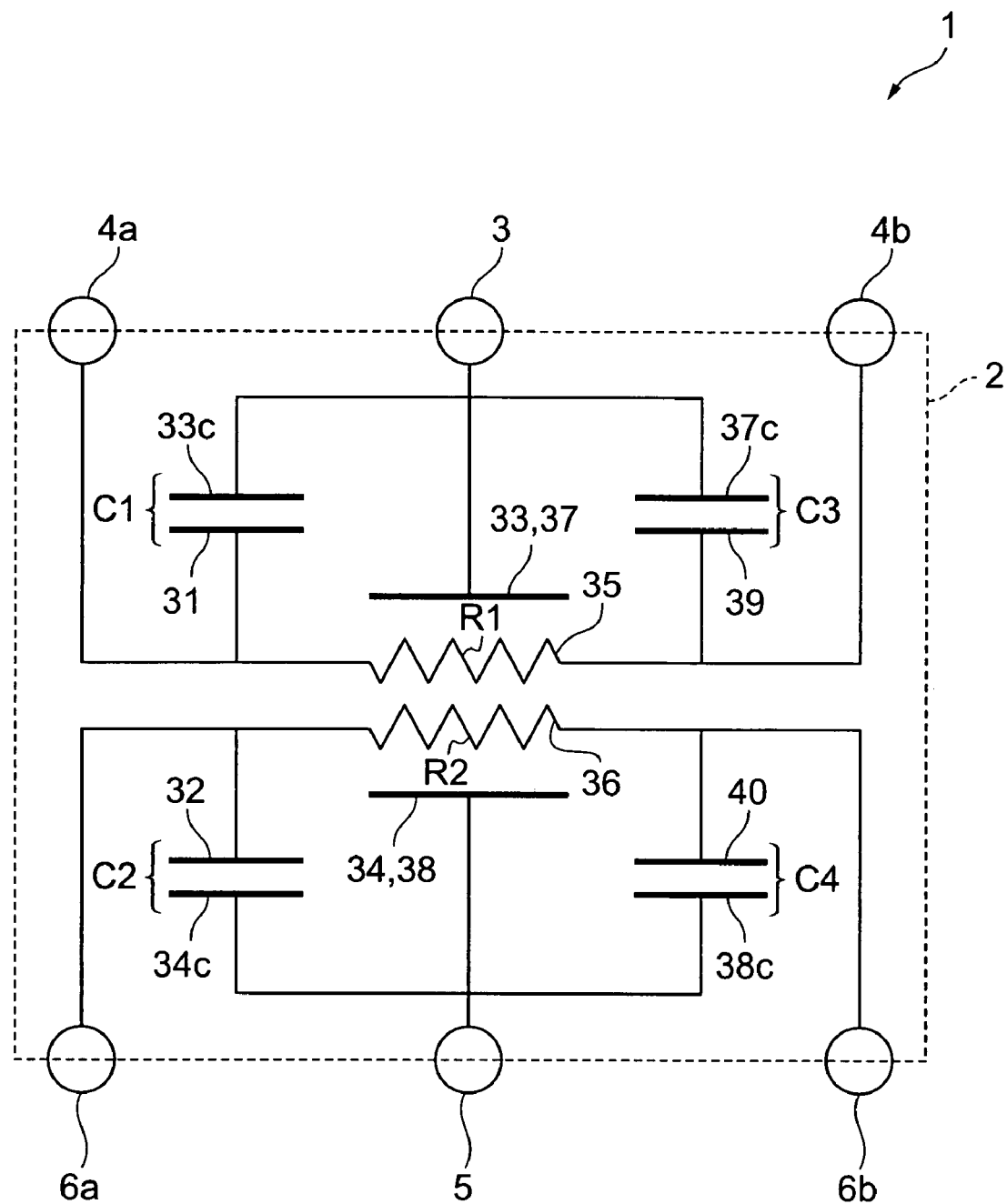
FIG. 3 is an equivalent circuit diagram of the feedthrough capacitor array of the first embodiment.

The feedthrough capacitor array 1 constructed as described above constitutes RC circuits. FIG. 3 is an equivalent circuit diagram of the feedthrough capacitor array of the first embodiment. As shown in FIG. 3, the first signal internal electrode 35 constitutes a resistance component R1. The second signal internal electrode 36 constitutes a resistance component R2.

The capacitor internal electrode 31 and the part 33c of the first ground internal electrode 33 opposed through the dielectric layer 22 to each other constitute a capacitor component C1. The capacitor internal electrode 32 and the part 34c of the second ground internal electrode 34 opposed through the dielectric layer 22 to each other constitute a capacitor component C2. The capacitor internal electrode 39 and the part 37c of the first ground internal electrode 37 opposed through the dielectric layer 25 to each other constitute a capacitor component C3. The capacitor internal electrode 40 and the part 38c of the second ground internal electrode 38 opposed through the dielectric layer 25 to each other constitute a capacitor component C4. The capacitor component C1 and the capacitor component C3 are connected in parallel to the resistance component R1, and the capacitor component C2 and the capacitor component C4 are connected in parallel to the resistance component R2.

In the feedthrough capacitor array 1, a circuit is composed of the first ground terminal electrode 3, the first signal terminal electrodes 4a, 4b, and the capacitor internal electrodes 31, 39, the first ground internal electrodes 33, 37, and the first signal internal electrode 35, which are formed in regions A, B in the dielectric element body 2. In the feedthrough capacitor array 1, another circuit is composed of the second ground terminal electrode 5, the second signal terminal electrodes 6a, 6b, and the capacitor internal electrodes 32, 40, the first ground internal electrodes 34, 38, and the second signal internal electrode 36, which are formed in regions C, D in the dielectric element body 2. The electrodes included in one of these two circuits are arranged so as not to overlap with the electrodes included in the other circuit, in the opposed direction (laminate direction).

For producing the feedthrough capacitor array 1 constructed as described above, a ceramic paste containing a ceramic powder such as a $BaTiO_3$-based ceramic, an organic binder, and a solvent is first prepared. This ceramic paste is applied onto PET film by the doctor blade method to prepare a plurality of green sheets of a rectangle supposed to become the aforementioned dielectric layers 21-27. The green sheets are dried and thereafter the screen printing method is used to form electrode patterns supposed to become the capacitor internal electrodes 31, 32, the first ground internal electrode 33, the second ground internal electrode 34, the first signal internal electrode 35, the second signal internal electrode 36, the first ground internal electrode 37, the second ground internal electrode 38, and the capacitor internal electrodes 39, 40, on upper surfaces of the green sheets.

Subsequently, the green sheets with the electrode patterns thereon are laminated in the predetermined order and simple green sheets are further laminated to form a green laminate. Next, the green laminate is subjected to press working and thereafter to debindering and firing, thereby obtaining the aforementioned dielectric element body 2. Finally, the first and second ground terminal electrodes 3, 5 and the first and second signal terminal electrodes 4a, 4b, 6a, 6b are formed on the surface of the dielectric element body 2, for example, by paste immersion and electroplating. The above completes the aforementioned feedthrough capacitor array 1.

In the feedthrough capacitor array 1 described above, the first ground internal electrodes 33, 37 are electrically connected through the first ground terminal electrode 3 to the ground, thereby to remove noise from a signal flowing in the first signal internal electrode 35 arranged as opposed to the first ground internal electrodes 33, 37. The second ground internal electrodes 34, 38 are electrically connected through the second ground terminal electrode 5 to the ground, thereby to remove noise from a signal flowing in the second signal internal electrode 36 arranged as opposed to the second ground internal electrodes 34, 38. The first signal internal electrode 35 is arranged so as not to overlap with the second ground internal electrodes 34, 38 in the aforementioned opposed direction, and the second signal internal electrode 36 is arranged so as not to overlap with the first ground internal electrodes 33, 37 in the aforementioned opposed direction. This permits the array to reduce crosstalk occurring through the first or second ground internal electrode 33, 34, 37, 38 between the first signal internal electrode 35 and the second signal internal electrode 36.

In the feedthrough capacitor array 1 of the present embodiment, the first signal internal electrode 35 and the second signal internal electrode 36 are arranged so as to adjoin each other in the direction perpendicular to the aforementioned opposed direction, and the first ground internal electrodes 33, 37 and the second ground internal electrodes 34, 38 are arranged so as to adjoin each other in the direction perpendicular to the aforementioned opposed direction. This permits the array to reduce occurrence of crosstalk and also to achieve efficient arrangement of the first and second signal internal electrodes 35, 36 and the first and second ground internal electrodes 33, 34, 37, 38 in the dielectric element body 2, thereby realizing downsizing.

In the feedthrough capacitor array 1 of the present embodiment, the dielectric element body 2 is of the rectangular parallelepiped shape elongated in one direction perpendicular to the aforementioned opposed direction, the two first signal terminal electrodes 4a, 4b and the first ground terminal electrode 3 are arranged on the side face 2d elongated in the one direction in the dielectric element body 2, and the two second signal terminal electrodes 6a, 6b and the second ground terminal electrode 5 are arranged on the side face 2c opposed to the side face 2d in the dielectric element body 2. This permits the first and second signal terminal electrodes 4a, 4b, 6a, 6b and the first and second ground terminal electrodes 3, 4 to be arranged in symmetry on the surface of the dielectric element body 2.

In the feedthrough capacitor array 1 of the present embodiment, the first signal internal electrode 35 and the second signal internal electrode 36 are of the rectangle elongated in one direction. This permits the spacing to be set relatively large between the first signal terminal electrodes 4a, 4b to which the first signal internal electrode 35 is connected, and permits the spacing to be set relatively large between the second signal terminal electrodes 6a, 6b to which the second signal internal electrode 36 is connected, whereby the first and second signal internal electrodes 35, 36 constitute the resistance components R1, R2. Therefore, the array can be a CR multiple capacitor consisting of the CR circuits.

In the feedthrough capacitor array 1 of the present embodiment, the first signal internal electrode 35 has the two lead portions 35a, 35b led out from the two end portions, and the two lead portions 35a, 35b of the first signal internal electrode 35 are electrically and physically connected to the two first signal terminal electrodes 4a, 4b, respectively. The second signal internal electrode 36 has the two lead portions 36a, 36b led out from the two end portions, and the two lead portions 36a, 36b of the second signal internal electrode 36 are electrically and physically connected to the two second signal terminal electrodes 6a, 6b, respectively. This configuration permits the spacing to be set relatively large between the first and second signal terminal electrodes 4a, 4b, 6a, 6b in the first and second signal internal electrodes 35, 36, and the first or second signal internal electrode 35, 36 constitutes the resistance component R1, R2. Therefore, the array can be a CR multiple capacitor consisting of the CR circuits.

In the feedthrough capacitor array 1 of the present embodiment, the width D1 of the lead portions 33a, 34a, 37a, 38a of the first ground internal electrodes 33, 37 and the second ground internal electrodes 34, 38 is set to be larger than the width D2 of the lead portions 35a, 35b, 36a, 36b of the first signal internal electrode 35 and the second signal internal electrode 36. This makes relatively large the cross section of the lead portions 33a, 37a, 34a, 38a of the first and second ground internal electrodes 33, 37, 34, 38, whereby parasitic inductance occurring in the lead portions can be reduced in the feedthrough capacitor array 1.

In the feedthrough capacitor array 1 of the present embodiment, there are the capacitor internal electrodes 31, 32, 39, 40 arranged as opposed through the dielectric layer 22, 25 to the first ground internal electrode 33, 37 and the second ground internal electrode 34, 38, and the capacitor internal electrodes 31, 32, 39, 40 are electrically and physically connected to the first signal terminal electrode 4a, 4b or the second signal terminal electrode 6a, 6b. Since this configuration forms the capacitor components C1-C4, impedance can be lowered in a wider band.

Figure 4:
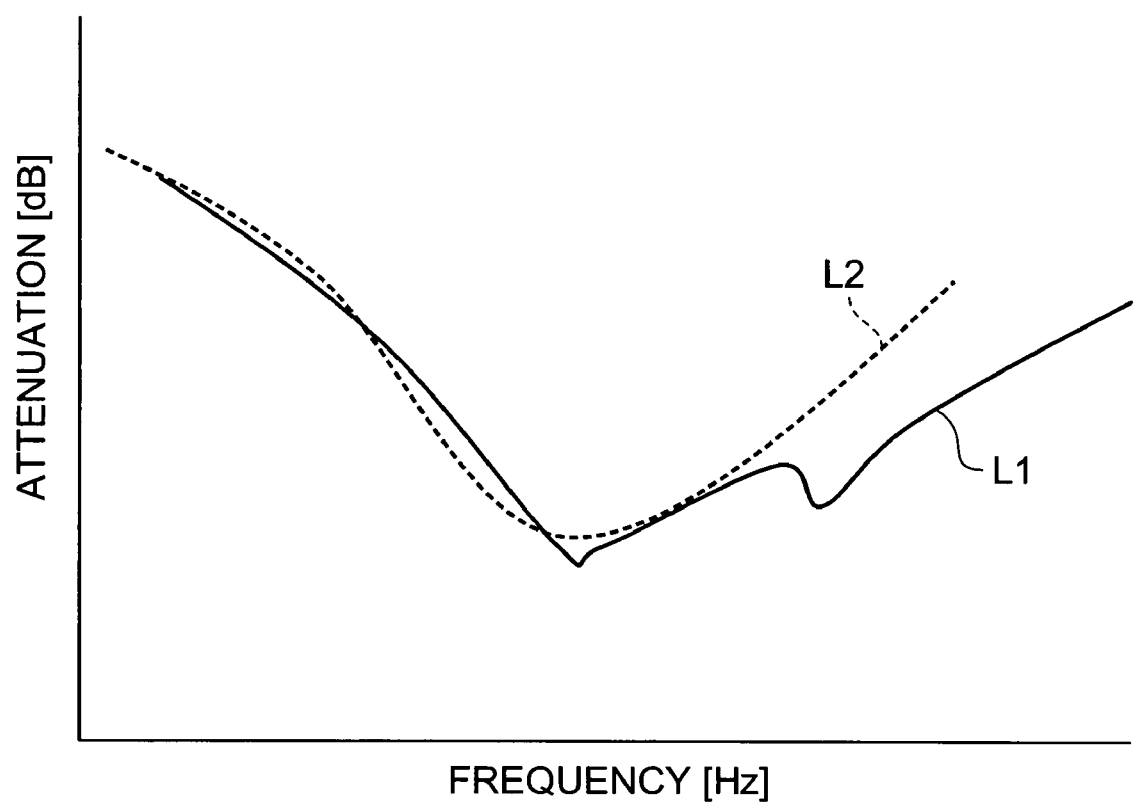
FIG. 4 is a graph showing a damping property of the feedthrough capacitor array of the first embodiment.

FIG. 4 is a graph showing a damping property of the feedthrough capacitor array of the first embodiment. In FIG. 4, a solid line L1 indicates the damping property of the feedthrough capacitor array 1 of the present embodiment, and a dashed line L2 indicates a damping property of a feedthrough capacitor array as a comparative example. The feedthrough capacitor array of the comparative example has the same configuration as the feedthrough capacitor array 1, except that the feedthrough capacitor array of the comparative example does not have the capacitor internal electrodes 31, 32, 39, 40 and does not have the capacitor components C1-C4 accordingly. As shown in FIG. 4, the feedthrough capacitor array 1 of the present embodiment has the capacitor internal electrodes 31, 32, 39, 40 and thus has the capacitor components C1-C4, and demonstrates the better damping property in the high frequency region than the feedthrough capacitor array of the comparative example.

In the feedthrough capacitor array 1 of the present embodiment, the capacitor internal electrodes 31, 32, 39, 40, the first and second ground internal electrodes 33, 34, 37, 38, the first and second ground terminal electrodes 3, 5, and the first and second signal terminal electrodes 4a, 4b, 6a, 6b are arranged in symmetry with respect to the surface on which the first and second signal internal electrodes 35, 36 are formed. Therefore, the same performance can be obtained even if the feedthrough capacitor array 1 is mounted in a reversed state in the opposed direction of the principal faces 2a and 2b, on a substrate.

Figure 5:
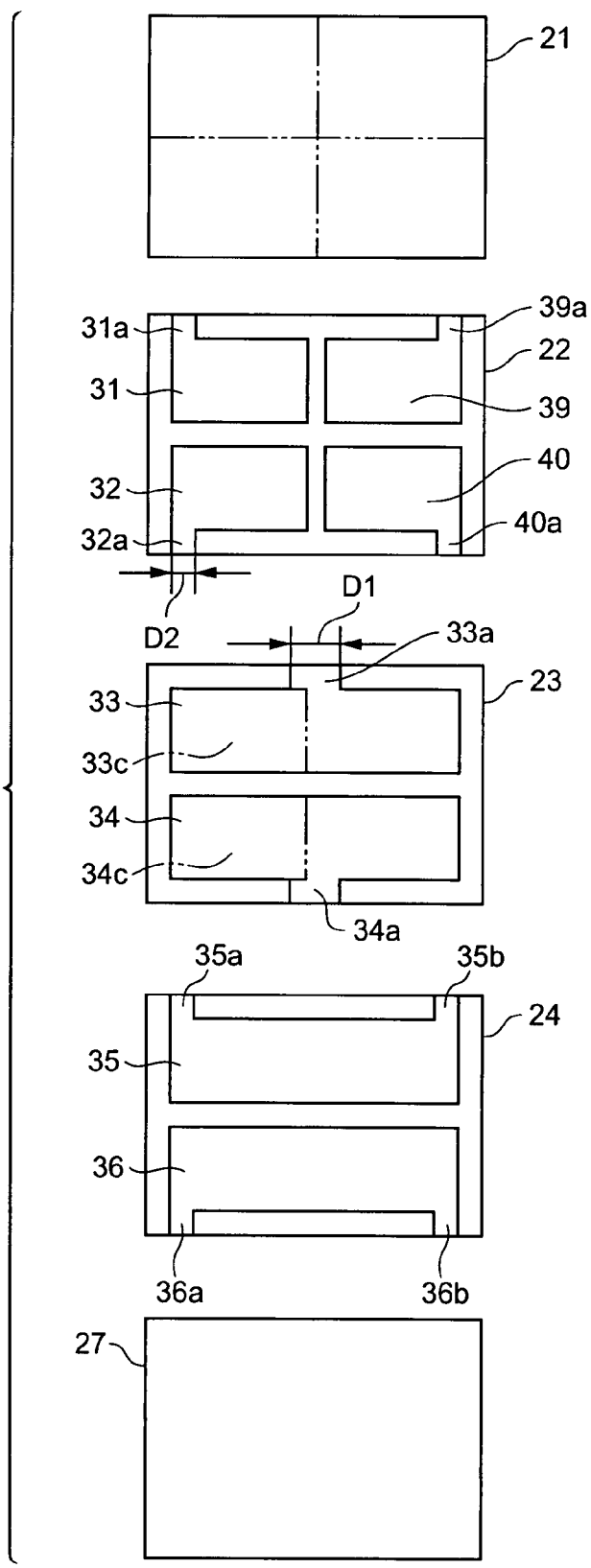
FIG. 5 is a schematic view showing a configuration of a dielectric element body and internal electrodes in a feedthrough capacitor array according to a modification example of the first embodiment.

The feedthrough capacitor array 1 may be modified as follows: as shown in FIG. 5, the capacitor internal electrodes 39, 40 are formed in regions B, D, respectively, of the dielectric layer 22, and the array does not have the dielectric layers 25, 26 and the first and second ground internal electrodes 37, 38. In this case, a capacitor component is established by the capacitor internal electrode 39 and a part of the first ground internal electrode 33 corresponding to region B, which are opposed through the dielectric layer 22 to each other. Another capacitor component is established by the capacitor internal electrode 40 and a part of the second ground internal electrode 34 corresponding to region D, which are opposed through the dielectric layer 22 to each other.

Second Embodiment

Figure 6:
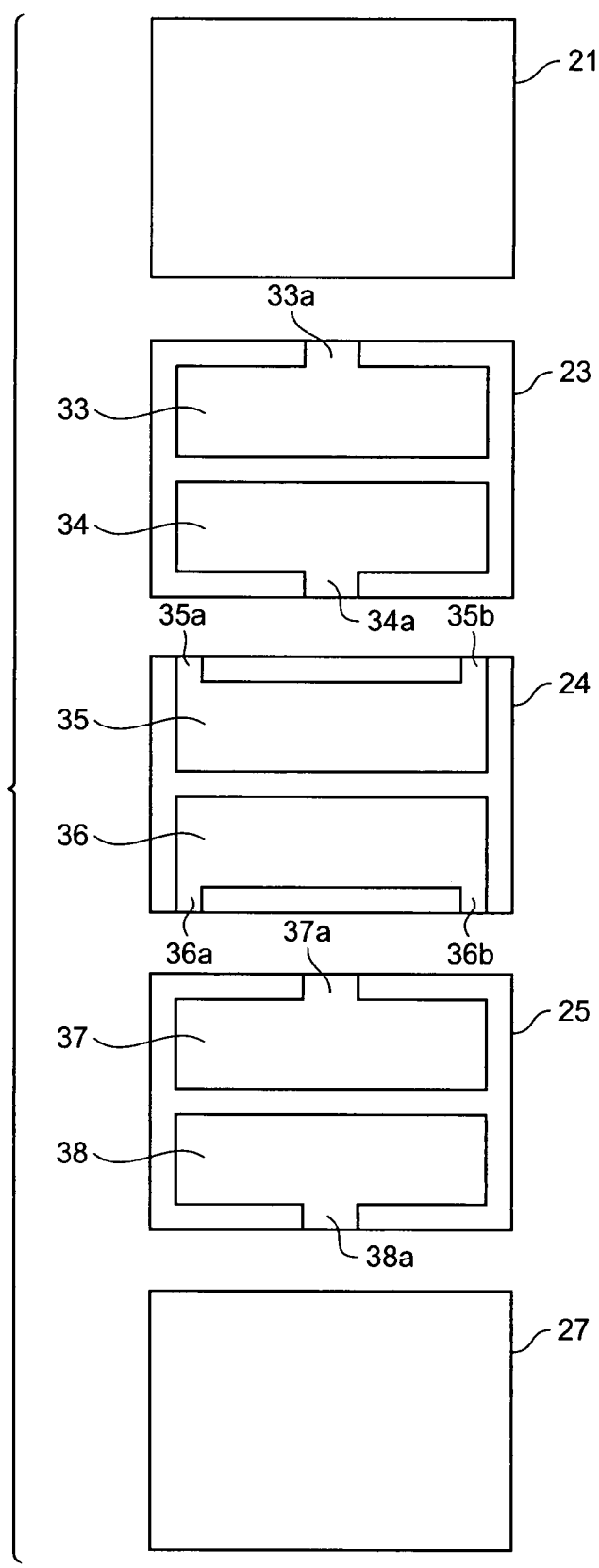
FIG. 6 is a schematic view showing a configuration of a dielectric element body and internal electrodes in a feedthrough capacitor array of the second embodiment.

The above embodiment illustrated the configuration with the capacitor internal electrodes 31, 32, 39, 40, but a feedthrough capacitor array according to the present invention may be one without these capacitor internal electrodes 31, 32, 39, 40. The following will describe such a feedthrough capacitor array of the second embodiment. FIG. 6 is a schematic diagram showing a configuration of a dielectric element body and each of internal electrodes included in the feedthrough capacitor array of the second embodiment.

The feedthrough capacitor array 51 of the second embodiment has first ground internal electrodes 33, 37, second ground internal electrodes 34, 38, a first signal internal electrode 35, a second signal internal electrode 36, a first ground terminal electrode 3, first signal terminal electrodes 4a, 4b, a second ground terminal electrode 5, and second signal terminal electrodes 6a, 6b similar to those in the aforementioned feedthrough capacitor array 1. The feedthrough capacitor array 51 has a dielectric element body 52 and the dielectric element body 52 includes the aforementioned dielectric layers 21, 23-25, 27.

Figure 7:
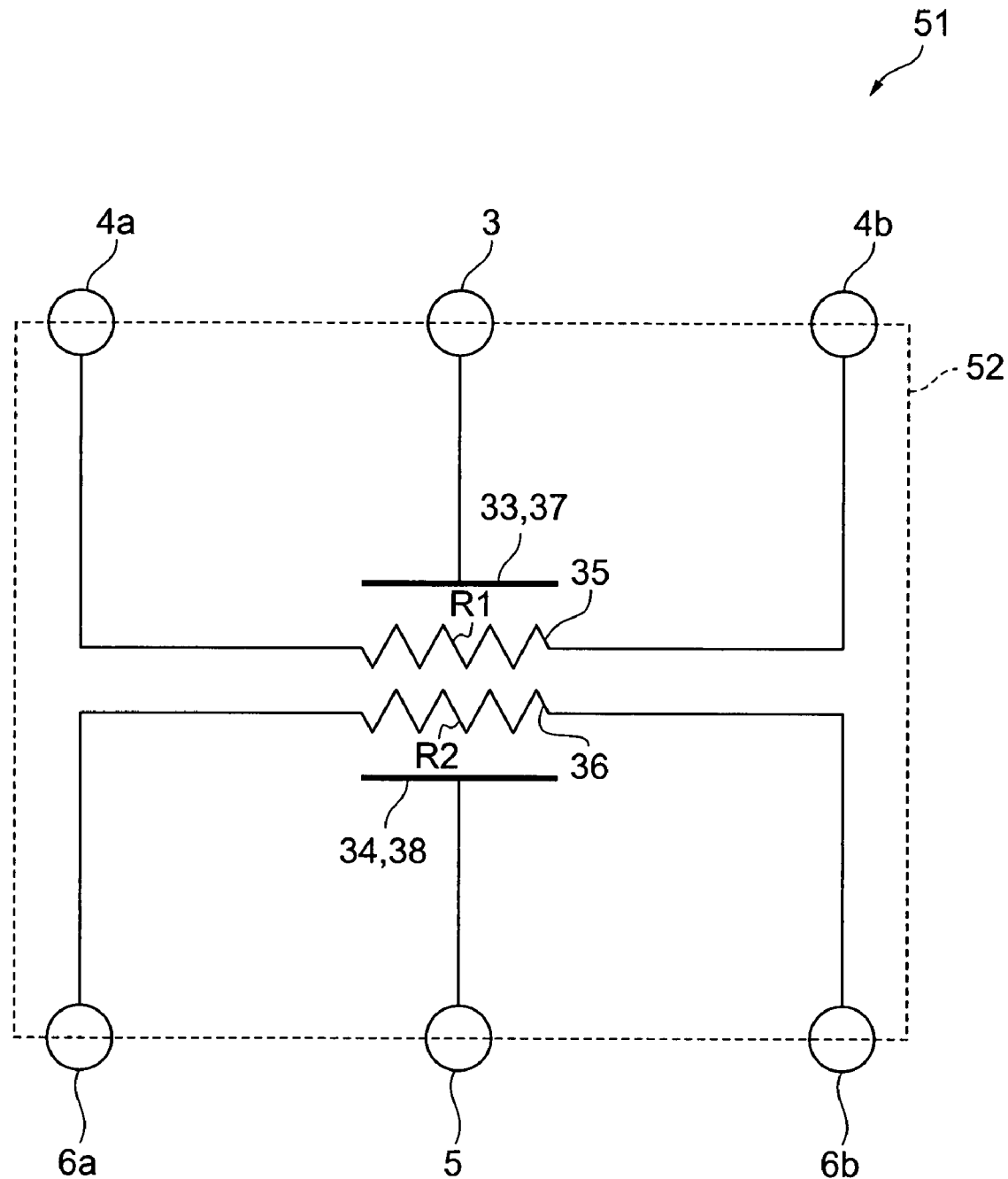
FIG. 7 is an equivalent circuit diagram of the feedthrough capacitor array of the second embodiment.

FIG. 7 is an equivalent circuit diagram of the feedthrough capacitor array of the second embodiment. As shown in FIG. 7, the first signal internal electrode 35 constitutes a resistance component R1 as in the feedthrough capacitor array 1. The second signal internal electrode 36 constitutes a resistance component R2.

In the feedthrough capacitor array 51 of the second embodiment, the first ground internal electrodes 33, 37 are also electrically connected through the first ground terminal electrode 3 to the ground, thereby to remove noise from a signal flowing in the first signal internal electrode 35 arranged as opposed to the first ground internal electrodes 33, 37. The second ground internal electrodes 34, 38 are electrically connected through the second ground terminal electrode 5 to the ground, thereby to remove noise from a signal flowing in the second signal internal electrode 36 arranged as opposed to the second ground internal electrodes 34, 38. The first signal internal electrode 35 is arranged so as not to overlap with the second ground internal electrodes 34, 38 in the aforementioned opposed direction, and the second signal internal electrode 36 is arranged so as not to overlap with the first ground internal electrodes 33, 37 in the aforementioned opposed direction. This configuration permits the array to reduce crosstalk occurring through the first or second ground internal electrode 33, 34, 37, 38 between the first signal internal electrode 35 and the second signal internal electrode 36.

Third Embodiment

Figure 8:
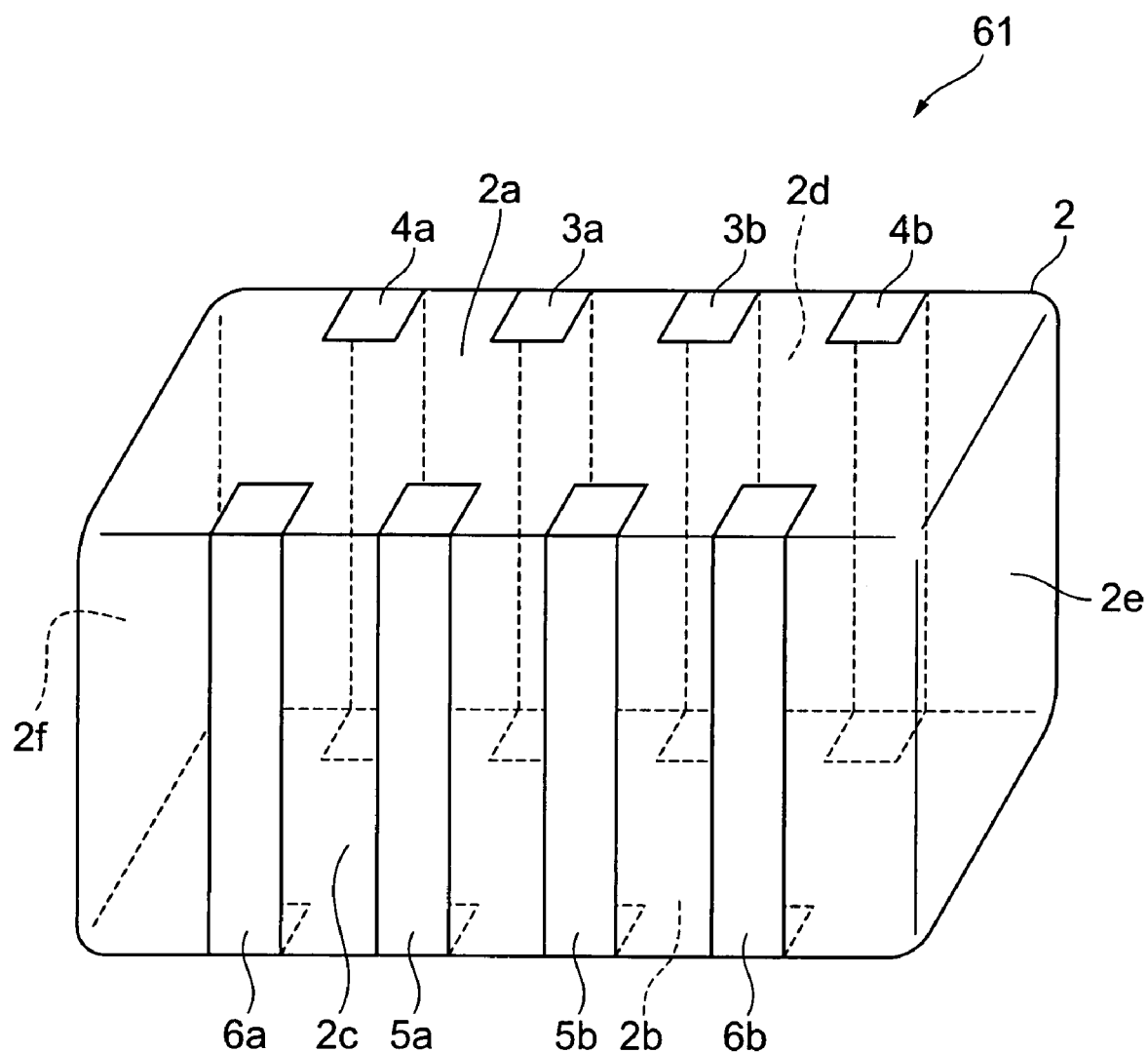
FIG. 8 is a schematic perspective view showing a feedthrough capacitor array of the third embodiment.
Figure 9:
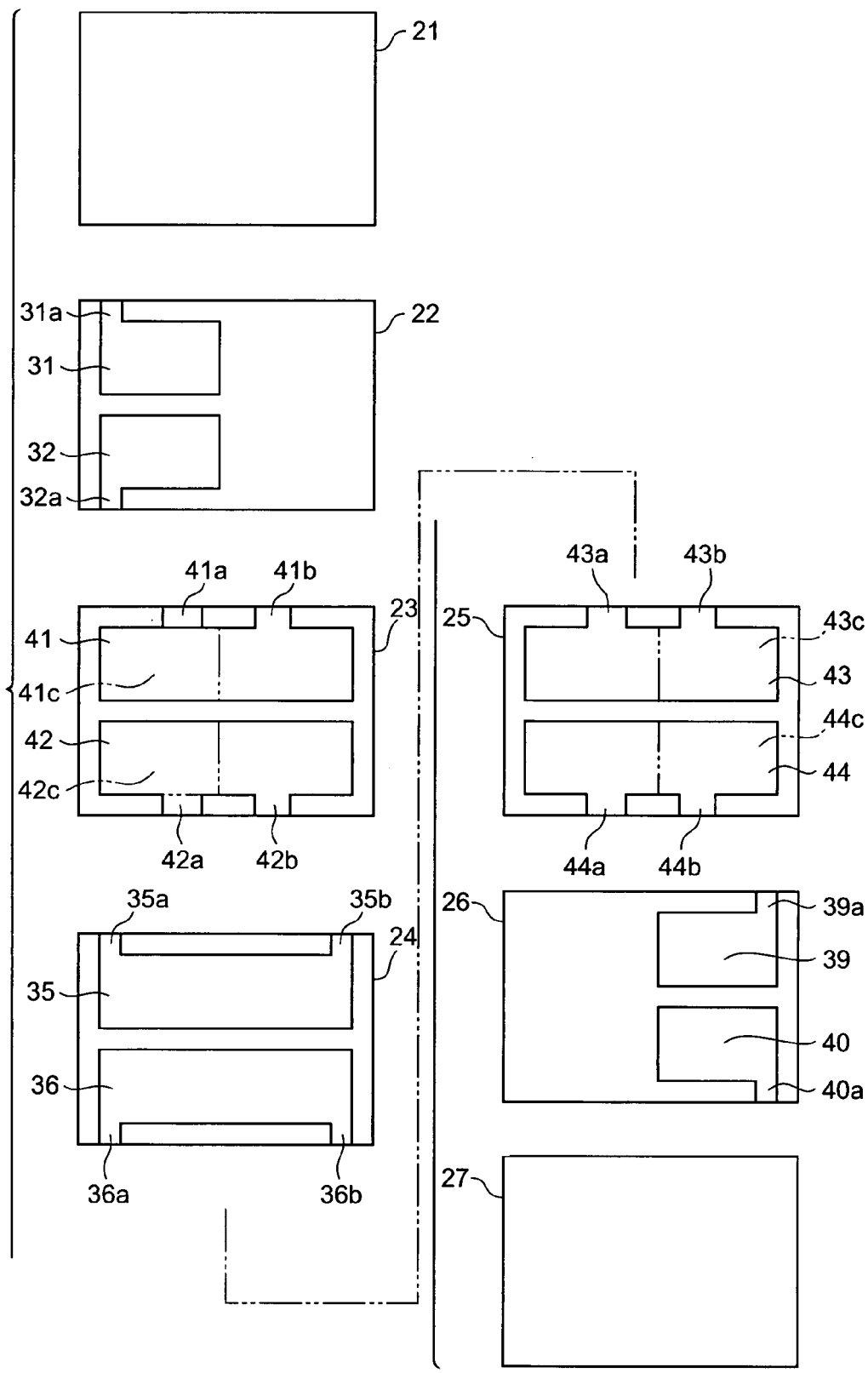
FIG. 9 is a schematic view showing a configuration of a dielectric element body and internal electrodes in the feedthrough capacitor array of the third embodiment.

The above embodiments illustrated the configurations wherein each of the first and second ground internal electrodes 33, 34, 37, 38 had one lead portion 33a, 34a, 37a, 38a, but a feedthrough capacitor array according to the present invention may be one in which each of the first or second ground internal electrodes has a plurality of lead portions. Such a feedthrough capacitor array of the third embodiment will be described below. FIG. 8 is a schematic perspective view showing the feedthrough capacitor array of the third embodiment. FIG. 9 is a schematic view showing a configuration of a dielectric element body and each of internal electrodes included in the feedthrough capacitor array of the third embodiment.

The feedthrough capacitor array 61 of the third embodiment has first and second ground internal electrodes 41-44 each of which is provided with two lead portions. The feedthrough capacitor array 61 has two first ground terminal electrodes 3a, 3b and two second ground terminal electrodes 5a, 5b electrically and physically connected to the two lead portions of the first and second ground internal electrodes 41-44, instead of the aforementioned first and second ground terminal electrodes 3, 5.

As shown in FIG. 8, the first ground terminal electrodes 3a, 3b are formed as isolated from each other between the two first signal terminal electrodes 4a, 4b on the side face 2d and formed so as to extend in the opposed direction of the principal faces 2a and 2b and come round to the principal faces 2a and 2b. The second ground terminal electrodes 5a, 5b are formed as isolated from each other between the two second signal terminal electrodes 6a, 6b on the side face 2c and formed so as to extend in the opposed direction of the principal faces 2a and 2b and come round to the principal faces 2a and 2b.

As shown in FIG. 9, the first ground internal electrode 41 is formed in a rectangular shape in regions A and B of the dielectric layer 23. The first ground internal electrode 41 has two lead portions 41a, 41b led out from near the center on the side face 2d side to the side face 2d. The lead portion 41a is electrically and physically connected to the first ground terminal electrode 3a, and the lead portion 41b is electrically and physically connected to the first ground terminal electrode 3b. These cause the first ground internal electrode 41 to be electrically and physically connected to the first ground terminal electrodes 3a, 3b.

The second ground internal electrode 42 is formed in a rectangular shape in regions C and D of the dielectric layer 23. The second ground internal electrode 42 has two lead portions 42a, 42b led out from near the center on the side face 2c side to the side face 2c. The lead portion 42a is electrically and physically connected to the second ground terminal electrode 5a, and the lead portion 42b is electrically and physically connected to the second ground terminal electrode 5b. These cause the second ground internal electrode 42 to be electrically and physically connected to the second ground terminal electrodes 5a, 5b.

The first ground internal electrode 43 is formed in a rectangular shape in regions A and B of the dielectric layer 25. The first ground internal electrode 43 has two lead portions 43a, 43b led out from near the center on the side face 2d side to the side face 2d. The lead portion 43a is electrically and physically connected to the first ground terminal electrode 3a, and the lead portion 43b is electrically and physically connected to the first ground terminal electrode 3b. These cause the first ground internal electrode 43 to be electrically and physically connected to the first ground terminal electrodes 3a, 3b.

The second ground internal electrode 44 is formed in a rectangular shape in regions C and D of the dielectric layer 25. The second ground internal electrode 44 has two lead portions 44a, 44b led out from near the center on the side face 2c side to the side face 2c. The lead portion 44a is electrically and physically connected to the second ground terminal electrode 5a, and the lead portion 44b is electrically and physically connected to the second ground terminal electrode 5b. These cause the second ground internal electrode 44 to be electrically and physically connected to the second ground terminal electrodes 5a, 5b.

The feedthrough capacitor array 61 of the third embodiment is also provided with the aforementioned dielectric element body 2, first and second signal terminal electrodes 4a, 4b, 6a, 6b, capacitor internal electrodes 31, 32, 39, 40, and first and second signal internal electrodes 35, 36, in addition to the above-described configuration.

The first ground internal electrode 41 has an overlap portion 41c to overlap with the capacitor internal electrode 31 through the dielectric layer 22. The second ground internal electrode 42 has an overlap portion 42c to overlap with the capacitor internal electrode 32 through the dielectric layer 22. The first ground internal electrode 43 has an overlap portion 43c to overlap with the capacitor internal electrode 39 through the dielectric layer 25. The second ground internal electrode 44 has an overlap portion 44c to overlap with the capacitor internal electrode 40 through the dielectric layer 25.

A capacitor component C1 is composed of the capacitor internal electrode 31 and the part 41c of the first ground internal electrode 41 opposed through the dielectric layer 22 to each other. A capacitor component C2 is composed of the capacitor internal electrode 32 and the part 42c of the second ground internal electrode 42 opposed through the dielectric layer 22 to each other. A capacitor component C3 is composed of the capacitor internal electrode 39 and the part 43c of the first ground internal electrode 43 opposed through the dielectric layer 25 to each other. A capacitor component C4 is composed of the capacitor internal electrode 40 and the part 44c of the second ground internal electrode 44 opposed through the dielectric layer 25 to each other.

Figure 10:
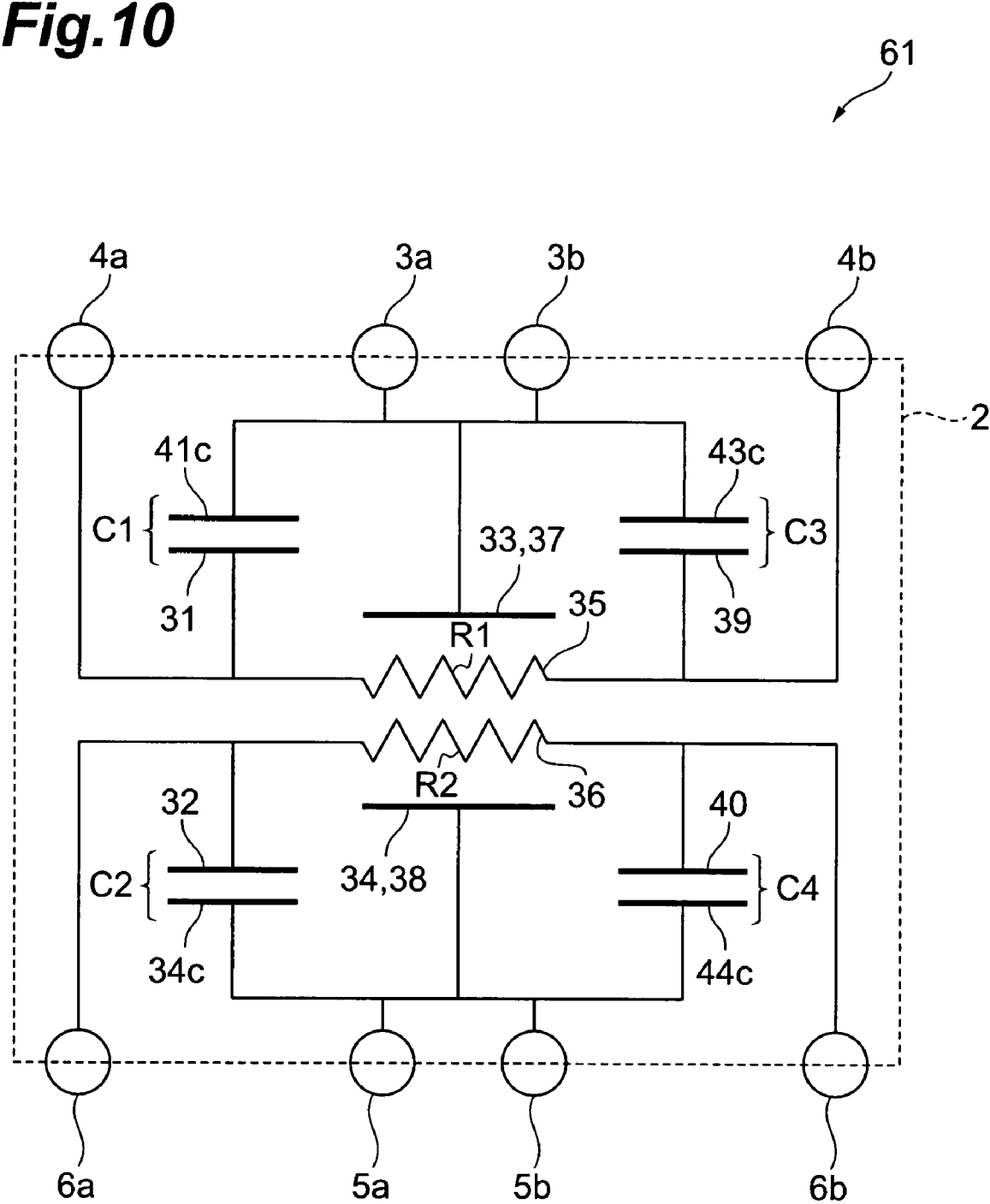
FIG. 10 is an equivalent circuit diagram of the feedthrough capacitor array of the third embodiment.

The feedthrough capacitor array 61 constructed in this manner constitutes RC circuits shown in FIG. 10. FIG. 10 is an equivalent circuit diagram of the feedthrough capacitor array of the third embodiment. The capacitor component C1 and the capacitor component C3 are connected in parallel to the resistance component R1, and the capacitor component C2 and the capacitor component C4 are connected in parallel to the resistance component R2.

In the feedthrough capacitor array 61 of the third embodiment described above, the first ground internal electrodes 41, 43 and the second ground internal electrodes 42, 44 each have the two lead portions 41a-44a, 41b-44b electrically and physically connected to the corresponding first ground terminal electrodes 3 or second ground terminal electrodes 5. This permits an electric current to the first or second ground terminal electrodes 3, 5 to be separately flowed through the two lead portions 41a-44a, 41b-44b, whereby parasitic inductance 5 occurring in the lead portions can be reduced.

In the above-described third embodiment, the number of each of the first and second ground terminal electrodes was two, but may be one. In that case, the lead portions 41a, 41b, 43a, 43b of the first ground internal electrodes 41, 43 are electrically and physically connected to one first ground terminal electrode, and the lead portions 42a, 42b, 44a, 44b of the second ground internal electrode 42, 44 are electrically and physically connected to one second ground terminal electrode.

Figure 11:
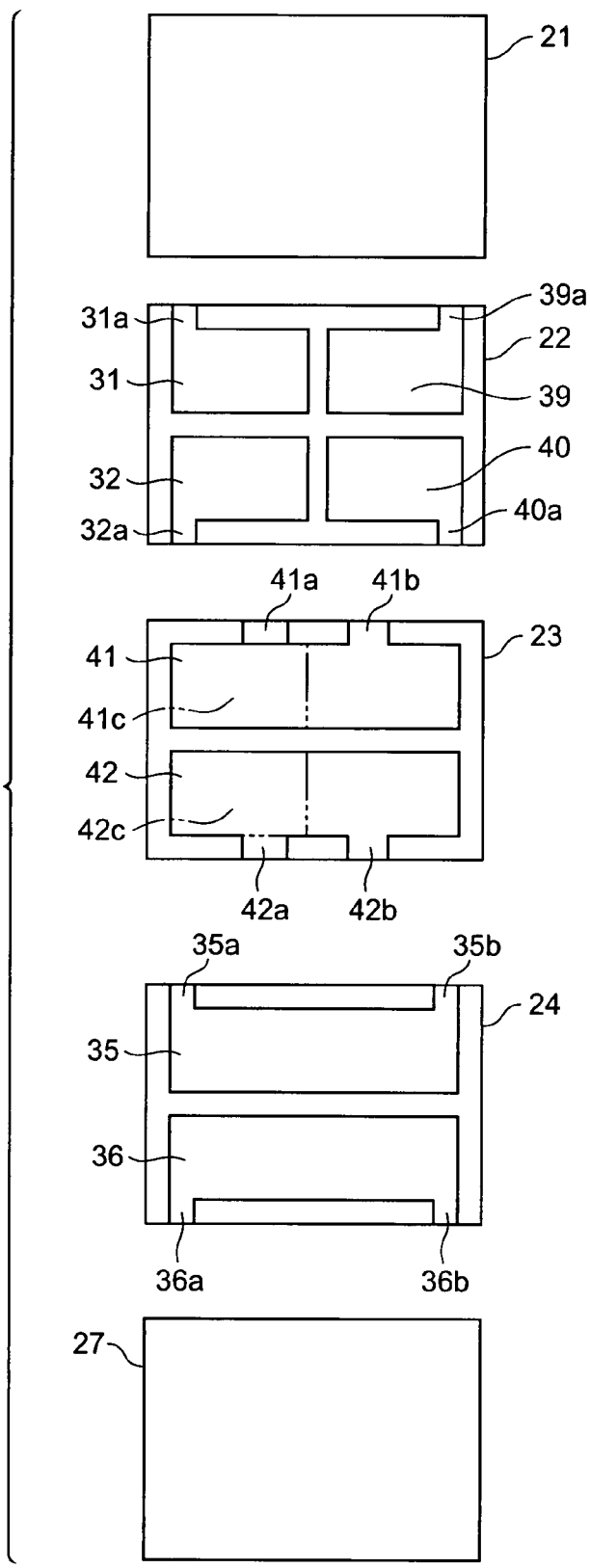
FIG. 11 is a schematic view showing a configuration of a dielectric element body and internal electrodes in a feedthrough capacitor array according to a modification example of the third embodiment.

The feedthrough capacitor array 61 may also be modified as follows: as shown in FIG. 11, the capacitor internal electrodes 39, 40 are formed in regions B, D, respectively, of the dielectric layer 22, and the feedthrough capacitor array does not have the dielectric layers 25, 26 and the first and second ground internal electrodes 37, 38. In this case, a capacitor component is composed of the capacitor internal electrode 39 and a part of the first ground internal electrode 41 corresponding to region B, which are opposed through the dielectric layer 22 to each other. Another capacitor component is composed of the capacitor internal electrode 40 and a part of the second ground internal electrode 42 corresponding to region D, which are opposed through the dielectric layer 22 to each other.

In the first to third embodiments, the number of each of the first signal terminal electrodes and the second signal terminal electrodes was two, but may be three or more. In that case, each of the first signal internal electrodes and the second signal internal electrodes is preferably provided with lead portions corresponding to the number of the first signal terminal electrodes and the second signal terminal electrodes.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A feedthrough capacitor array comprising:
a dielectric element body of a substantially rectangular parallelepiped shape;
a first signal internal electrode and a first ground internal electrode arranged to be opposed to each other through a part of the dielectric element body;
a second signal internal electrode and a second ground internal electrode arranged to be opposed to each other through a part of the dielectric element body, in an opposed direction in which the first signal internal electrode and the first ground internal electrode are opposed;
at least two first signal terminal electrodes arranged on a surface of the dielectric element body and electrically and physically connected each to the first signal internal electrode;
at least two second signal terminal electrodes arranged on the surface of the dielectric element body and electrically and physically connected each to the second signal internal electrode;
a first ground terminal electrode arranged on the surface of the dielectric element body and electrically and physically connected to the first ground internal electrode; and
a second ground terminal electrode arranged on the surface of the dielectric element body and electrically and physically connected to the second ground internal electrode;
wherein the first signal internal electrode and the second ground internal electrode are arranged so as not to overlap each other in the opposed direction; and
wherein the second signal internal electrode and the first ground internal electrode are arranged so as not to overlap each other in the opposed direction.

2. The feedthrough capacitor array according to claim 1, wherein the first signal internal electrode and the second signal internal electrode are arranged so as to adjoin each other in a direction perpendicular to the opposed direction, and
wherein the first ground internal electrode and the second ground internal electrode are arranged so as to adjoin each other in the direction perpendicular to the opposed direction.

3. The feedthrough capacitor array according to claim 1, wherein the dielectric element body is of a rectangular parallelepiped shape elongated in one direction perpendicular to the opposed direction,
wherein said at least two first signal terminal electrodes and the first ground terminal electrode are arranged on a side face elongated in said one direction in the dielectric element body, and
wherein said at least two second signal terminal electrodes and the second ground terminal electrode are arranged on a side face opposed to said side face in the dielectric element body.

4. The feedthrough capacitor array according to claim 3, wherein at least one of the first signal internal electrode and the second signal internal electrode is of a rectangle elongated in said one direction.

5. The feedthrough capacitor array according to claim 1, wherein the first signal internal electrode has two lead portions led out from two end portions thereof, and
wherein each of the two lead portions of the first signal internal electrode is electrically and physically connected to a corresponding one of said at least two first signal terminal electrodes.

6. The feedthrough capacitor array according to claim 1, wherein the second signal internal electrode has two lead portions led out from two end portions thereof, and
wherein each of the two lead portions of the second signal internal electrode is electrically and physically connected to a corresponding one of said at least two second signal terminal electrodes.

7. The feedthrough capacitor array according to claim 1, wherein at least one ground internal electrode out of the first ground internal electrode and the second ground internal electrode has a plurality of lead portions electrically and physically connected to the first ground terminal electrode or the second ground terminal electrode corresponding thereto.

8. The feedthrough capacitor array according to claim 1, wherein each of the first signal internal electrode and the second signal internal electrode has at least two lead portions electrically and physically connected to said at least two first signal terminal electrodes or said at least two second signal terminal electrodes corresponding thereto,
wherein each of the first ground internal electrode and the second ground internal electrode has a lead portion electrically and physically connected to the first ground terminal electrode or the second ground terminal electrode corresponding thereto, and
wherein a width of the lead portion of the first ground internal electrode or the second ground internal electrode is larger than a width of the lead portions of the first signal internal electrode and the second signal internal electrode.

9. The feedthrough capacitor array according to claim 1, comprising a capacitor internal electrode arranged to be opposed to at least one ground internal electrode out of the first ground internal electrode and the second ground internal electrode through a part of the dielectric element body,
wherein the capacitor internal electrode is electrically and physically connected to the first signal terminal electrode or the second signal terminal electrode.

* * * * *